United States Patent Office 3,493,500
Patented Feb. 3, 1970

3,493,500
ACRYLIC ACID POLYMERS
Henry Volk, Bay City, and Percy Jay Hamlin, Midland, Mich., assignors to The Dow Chemical Company, Midland, Mich., a corporation of Delaware
No Drawing. Filed Oct. 20, 1966, Ser. No. 587,964
Int. Cl. C08d 1/04; C02b 1/20
U.S. Cl. 210—54                                    6 Claims

ABSTRACT OF THE DISCLOSURE

Acrylic acid polymers are obtained in the form of an aqueous suspension of disperse solid-polymer particles when a monomer composition is polymerized with agitation, the monomer composition consisting of ethylenically unsaturated water-soluble monomers comprising at least about 10 weight percent of acrylic acid and from 0 up to about 90 weight percent of acrylamide and the monomer composition being dissolved, at a pH within the range from about 1 to about 4 in a water solution of a water-soluble ammonium, alkali metal, alkaline earth metal or zinc salt of a strong inorganic acid wherein such salt is present in amounts sufficient to precipitate the polymer formed.

SUMMARY OF THE INVENTION

The present invention concerns a novel polymerization process for water-soluble acrylic acid polymers, i.e. homopolymers of acrylic acid and copolymers thereof with other water-soluble monomers, especially acrylamide. A further concern of the invention is to provide such water-soluble acrylic polymers in the form of highly useful and conveniently fluid suspensions of polymer solids in aqueous media. Novel polymeric compositions are also provided.

The solution polymerization of acrylic acid and mixtures thereof with water-soluble comonomers to prepare water-soluble polymers is widely practiced. Such polymers are used in a wide variety of arts such as in the flocculation and filtration of aqueous suspensions of solids, oil well drilling fluids, secondary recovery of oil by water flooding and paper making.

Although a number of successful processes for the preparation of such polymers are known, current processes generally involve solution polymerization in an aqueous reaction medium. Considerable difficulty is encountered in these processes when working up a useful product from the polymerization gel. Often the gel of a solution polymerization reaction is a tough rubbery mass. This is especially true if high molecular weight polymers are prepared.

Techniques for working up the polymer gel include precipitation of the polymer with a non-solvent, which is miscible with the polymerization gel, or drying the gel to obtain a solid polymeric residue. These techniques are illustrated by the claimed processes of recent U.S. patents: 3,041,318; 3,042,970; 3,046,259, and 3,215,680.

Although successful to a degree, these techniques introduce further processing problems. For instance, precipitation of the polymer with a solvent necessitates solvent recovery for efficient operation. Drying the polymerizate as by heating it on drum rolls, while a direct approach, has several drawbacks such as achieving polymer release from the rolls and molecular degradation as the result of heating. Also, whenever a stiff rubbery polymerization gel is neutralized prior to drying, the mixing of reagents, with the gel is necessitated. The energy requirements to accomplish this are substantial.

Improved methods for preparing water-soluble polymers of acrylic monomers have long been sought and numerous patented processes have resulted from extensive research in this field. Nevertheless, improved polymerization processes are needed which will permit polymerization of the acrylic monomers in inert and inexpensive solvents, such as water. Particularly a polymerization process is needed for high molecular weight acrylic acid polymers such that the polymer is readily adapted for separation or use directly from the polymerizate. Thus, it would be especially desirable to provide a high molecular weight, water-soluble acrylic acid polymer of convenient application without separating the polymer solids from the polymerizate. Additionally, it would be highly desirable to provide such water-soluble polymers in the form of a fluid polymerizate from which the polymer may be efficiently and easily separated. A still further object would be the preparation of a polymerizate useful in the manufacture of novel modified flocculant compositions. The foregoing objects, and other benefits, as will become apparent hereinafter, are accomplished in the present invention.

The present invention involves the discovery that acrylic acid polymers, which include homopolymers of the acid, copolymers thereof with up to about 90 weight percent of acrylamide comonomer, or copolymers thereof with small amounts of optional diluent monomers copolymerizable with the acrylic monomers and soluble as a monomer in the monomer system, can be polymerized in aqueous solution to form fluid, liquid suspension polymerizates of the polymers. That is, the polymer exists in the polymerizate largely in the form of suspended solids. These suspension polymerizates are opaque to light.

Such suspension polymerizates are achieved by polymerizing a water-soluble monomer composition comprising at least about 10 weight percent of acrylic acid in an acidic water solution in the presence of an amount of a water-soluble inorganic salt sufficient to precipitate polymer as it is polymerized in solution, but insufficient to precipitate the monomer. Suitable water-soluble salts include for example alkali metal, ammonium (including substituted ammonium) and alkaline earth metal salts of strong inorganic acids. The minimum amount of salt necessary to induce precipitation of acrylic acid polymers under the above conditions will vary according to the composition and temperature of the monomer charge but will generally fall within the range from at least about 0.1 percent, usually at least about 1 percent, up to about 60 percent, by weight, based on the weight of the total polymerization system. As a rule, the lower the temperature of the reaction system, the lower will be the minimum amount of salt required to produce the suspension polymerizate.

For best results, an alkali metal or ammonium salt of sulfuric, hydrochloric, phosphoric or nitric acid is used and no more salt is used than is sufficient to form a polymer suspension. With copolymers of acrylic monomers containing at least 30 weight percent of an acrylic acid, stable suspensions of solid polymers are obtained, i.e. they do not dissolve on standing. Dissolution of the polymer results in the formation of a translucent to clear gel.

Critical to successful operation in accordance with the invention is initiating the polymerization reaction at a pH within the range from about 1 up to about 4, preferably within the range from about 2 to about 3.5. A further essential condition is supplying agitation to the polymerization system during the polymerization reaction. The agitation required is that sufficient to keep the disperse solid polymer, as it forms, suspended throughout the reaction system. Preferably the polymerization is carried out under an atmosphere in which the oxygen content has been reduced. This can be accomplished by purging the reaction system with a gas essentially free of oxygen to reduce the oxygen content of the atmosphere above it, below about 1 percent by weight.

By conducting the polymerization reaction in the foregoing manner, flowable, i.e. fluid, polymerizates are prepared in systems containing up to as much as about 30 percent by weight, or more, of initial dissolved monomer charge which, upon polymerization, becomes a dispersed precipitate of polymer solids. Suspensions with as little as 1 percent by weight suspended polymer solids can be prepared, but usually more concentrated suspensions are desired for production economy. Frequently, polymer solids will be within the range from about 10 to 30 percent by weight of the polymerizates.

Depending upon the proportion of catalyst used, and control of other process parameters recognized by the art skilled as affecting molecular weight, acrylic acid polymers can be prepared in accordance with the invention having molecular weights up to ten million or more.

The polymerizates of acrylic acid polymers prepared according to the invention can be utilized as such, simply by dispersing them in an applicating aqueous medium. When diluted sufficiently, the acid form of the polymerizate will dissolve in water as evidenced by an increase in the viscosity of the water. The more readily soluble salt form of the polymer can be prepared by adjusting the pH of the applicating solution with a suitable base.

Alternately, a solid polymeric product can be recovered from the polymerizate by coagulating the dispersed polymer solids and filtering the polymerizate to recover the solid polymer. If desired, the dry acidic polymer can be blended with sufficient alkali carbonate or bicarbonate solids to prepare a readily dispersing self-neutralizing admixture.

Interestingly, the unneutralized acrcylic acid polymers of the invention can be employed in the acid form for many purposes including the efficient flocculation of aqueous suspensions of inorganic and organic solids.

The salts of the polymers can be prepared simply by forming a dilute aqueous solution of the suspension polymerizate, or the solid polymer previously recovered therefrom, and adjusting the pH of the dilute solution with a soluble alkali base to form a salt of the polymer. The resulting dissolved polyelectrolyte is also a highly effective flocculant. Such neutralization is best carried out in solutions with less than about 5 percent by weight polymer solids to avoid forming a gel too viscous for convenient use.

Acrylic amide monomers useful for preparing copolymers with acrylic acid, in accordance with the invention, include acrylamide and the water soluble, nitrogen substituted acrylic amides. Illustrative of such monomers are N-alkyl, N,N-dialkyl, N-aminoalkyl and N-hydroxyalkyl substituted derivatives of acrylamide, such as N-methyl acrylamide, N-isopropyl acrylamide, N,N-dimethyl acrylamide, N,N-dimethylaminomethyl-N-acrylamide, N,N-dimethylaminoethyl-N-acrylamide and N-methylaminoisopropyl-N-acrylamide.

Although the invention generally contemplates homopolymers of acrylic acid and certain copolymers thereof with acrylic amides, other monomers may be used in amounts insufficient to render the solution-polymerized product soluble in the acidic polymerizate. (Such a third class of monomers is termed herein "diluent monomers.") Such diluent monomers are generally used in amounts less than about 25 weight percent, based on the weight of the monomer charge. These diluent comonomers may be any water-soluble monomer which is soluble in and copolymerizable with acrylic acid. Exemplary of such other comonomers are the cationic, water-soluble aminoalkyl acrylates including for example aminoethyl acrylate, dimethylaminoethyl acrylate, methylaminoethyl methacrylate and dimethylaminoethyl methacrylate. These are highly preferred as a diluent monomer. The copolymers prepared therefrom have each anionic and cationic moieties. Still other comonomers include N-vinylpyridine, N-vinylpyrrolidone, N-vinyloxazolidinone, N-vinyl-5-methyloxazolidinone, acrylonitrile and vinylbenzyltrimethyl ammonium chloride. Other copolymers may contain anionic monomers. Examples of such are styrene sulfonic acid, vinyl sulfonate, sulfoethyl acrylate, maleic acid and the like. In general, any ethylenically unsaturated monomer at least slightly water-soluble and interpolymerizable with acrylic acid, or mixtures of acrylic acid and acrylic amide, can be incorporated into the polymerization systems of the present invention. Such monomer mixtures will contain at least about 20 weight percent of acrylic acid and usually no more than about 20 percent by weight of an optional diluent monomer other than acrylic acid or an acrylic amide monomer.

The preferred polymers of the invention are copolymers of acrylic acid and acrylamide having from 70 to 30 weight percent acrylic acid and correspondingly from 30 to 70 weight percent acrylamide. It is possible to prepare these copolymers with ultra high molecular weights in excess of two million utilizing a comparatively small amount of the inorganic salt n the polymerization system. For instance, whereas at least about 10 to 20 percent by weight of an inorganic salt may be necessary to prepare suspension homopolymers of acrylic acid; as little as 1 percent by weight of the same salt will produce suspensions of copolymers of acrylic acid and acrylamide within the above preferred monomer composition range. In the preparation of such copolymers, the amount of water-soluble salt used, especially alkali metal salts, will vary for best results within the range from 1 to 8 percent by weight of the polymerization system.

As the amount of acrylic acid is a copolymer is decreased below the 30 weight percent specified above, the amount of salt necessary to produce a suspension of the polymer becomes substantial. Also, with the use of large amounts of salt, under the conditions of the present invention, a lower molecular weight product is usually obtained. Such products have substantially less effectiveness as flocculants.

Salts useful in the practice of the invention include the water-soluble salts of strong inorganic acids, i.e. having an ionization constant greater than about $1 \times 10^{-3}$. Although salts of polyvalent cations can be employed, such as magnesium, calcium and zinc chlorides and corresponding water-soluble sulfates, the preferred salts are the alkali metal salts of the strong mineral acids. Ammonium salts also are particularly useful. Ammonium chloride is a preferred salt for the preparation of polymerizates of superior long term stability as fluid suspensions. Exemplary salts are those of hydrochloric, sulfuric, phosphoric and nitric acids. The useful salts may be employed alone or in combinations.

A general rule is that the hydrochloric acid salts are more effective, in that smaller amounts are required, than other inorganic acid salts with increasing acrylic acid content in the monomer charge. For monomer charges having in excess of 30 percent by weight acrylic acid, sodium chloride is the preferred salt. For best results, salts of hydroiodic acid should be kept to a minimum because of their normal inhibitory effect on the polymerization system.

As previously set forth, the pH of the polymerization system must be adjusted to within the range from about 1 up to the maximum of about 4. Depending upon the nature of the monomers charged, i.e. whether acidic, free base or salt forms are used, the polymerization charge may need adjustment to the desired pH range by the addition, as needed, of a strong mineral acid such as sulfuric or hydrochloric acid.

The agitation for the polymerization reaction may be supplied in the form of any convenient means such as stirrers, shaking or rotating reaction vessels, turbulent fluid flow as in a tubular continuous reactor. The sufficiency of the agitation is readily determined by observing whether polymer precipitating from the solution polymerization system remains suspended and dispersed in the polymerizate during the polymerization reaction.

When operating within the preferred limits for monomer composition and with low salt contents on the order of 1 to 8 percent by weight salt, based on the weight of the total polymerization system, suspensions of the copolymer are obtained which are stable as suspensions almost indefinitely. That is, suspensions are prepared which will remain fluid and readily flowable for periods in excess of several months.

In addition to the foregoing parameters, polymerzation of the monomer charge is initiated with any one of a great number of free radical polymerization catalytic means including catalytic irradiation and chemical catalysts. Illustrative chemical free radical catalysts include tertiarybutylhydroperoxide, ditertiarybutylperoxide, benzoyl peroxide, hydrogen peroxide, ammonium persulfate, potassium persulfate, sodium persulfate, sodium chlorate, potassium chlorate, ammonium chlorate, sodium perborate, potassium perborate, ammonium perborate, sodium percarbonate, potassium percarbonate, ammonium percarbonate and the like. As a redox system, one may use catalysts comprising an oxygen containing compound and a reducing agent, such as the combination of sodium persulfate with sodium bisulfite, sodium persulfate with potassium bisulfite, potassium persulfate with sodium bisulfite, potassium persulfate with potassium bisulfite, ammonium persulfate with sodium thiosulfate and the like. When higher molecular weight polymers are desired, a combination of an alkali metal bromate and an alkali metal sulfite or an alkali persulfate with a tertiary amine can be used. These latter catalytic combinations are described in significant detail in the U.S. Patent 3,002,960. As a general rule, the catalysts used in the present invention will be used in an amount between about 0.0005% and 1% by weight based on the weight of the monomer and preferably from about 0.001% and .02% by weight, same basis, when high molecular weight polymers are produced. Enough catalyst is added to achieve polymerization and the formation of a suspension polymerizate.

Having prepared the polymerization charge and provided for agitation adequate to the needs of the system, polymerization is usually initiated by removing oxygen from the system and heating the aqueous solution of the acrylic acid with, or without, optional acrylamide or other diluent monomers. Removal of oxygen can be achieved by a chemical oxygen scavenger or by physical means such as evacuating or purging the system with a gas which is essentially free of oxygen. The heating is carried out at a temperature sufficient to achieve polymerization of the monomer charge. This can be accomplished from temperatures as low as just above the freezing point of the system up to about 100° C. As previously mentioned, lower polymerization temperatures favor the formation of the suspension polymerizates with the use of less salt. Usually the temperature of polymerization is within the range from about 20° C. to about 60° C. Polymerization is continued until a major portion of the charged monomer is converted to polymer. Conversions of at least about 25 percent are required for the onset of polymer precipitation in the reaction system.

The molecular weight of the resulting polymer is, of course, dependent in a large measure upon the amount of catalyst used, temperature of polymerization and the time allowed for the reaction. Optimum molecular weights will be achieved for the copolymers by utilizing as little of the inorganic salt as is necessary to achieve a fluid, i.e. pourable, polymerizate or polymer suspension.

As previously mentioned, the suspensions of solid polymer in the polymerizate are often stable as suspensions for an extended period of time. However, to extend this stability, it is desirable to incorporate an additional amount of the inorganic salt into the suspension upon completion of the polymerization reaction. An additional amount of a water-soluble inorganic salt of a strong acid, either the same as was used in the polymerization or a different one, in an amount from about 0.1 up to about 5 percent by weight, based on the total polymerizate, will aid in keeping the suspension fluid. Such additional amounts of salt are most desirable when preparing high molecular weight polymers in the presence of the minimum, or approximate minimum amount of inorganic salt necessary to achieve precipitation of a solid polymer from the solution polymerization system.

In the event a solid polymeric product is desired, the polymerizate can be readily coagulated by the addition thereto of an organic solvent miscible with the polymerization system. Such solvents include for example acetone, methanol and ethanol. Incorporation of such solvent into the polymerizate causes the coagulation of the disperse polymeric solids which can be readily recovered from the polymerizate by filtration. A powdery particulate polymeric product is obtained upon drying and grinding of the filter cake.

The following examples further illustrate the compositions and processes of the present invention.

Examples 1–12

A series of polymerizations were carried out to illustrate the parameters and results of the present invention. All polymerizations were conducted in a 3 necked, 1 liter reaction vessel equipped with a stirrer, nitrogen sparger, temperature control means and a reflux condenser. After the polymerizate ingredients, including monomer, salt and water were added, the system was purged with nitrogen. A redox catalyst was then charged and the system was again purged with nitrogen. Thereafter the polymerization system was maintained under effective polymerization conditions for a given period of time or until a desired conversion of monomer to polymer was achieved. In each polymerization run, the amount of monomer was 10 percent, based on total polymerizate. The polymerizations were catalyzed with potassium persulfate and sodium metabisulfite using 1.87 parts of the former ingredient for each part by weight of the latter. All polymerizations were initiated at room temperature of about 25° C. The measured pH of each reaction system was about 2.5. The other details of the polymerization systems including the type and amount of salt used, monomer charge composition and amount of catalyst composition, are listed in the following table along with results of the polymerization reactions.

TABLE I

| Example Number | Monomer Comp.[1] | Salt Type | Salt Conc. (percent) | Catalyst Conc.[2] percent | Poly. Time (hrs.) | Monomer Conversion (percent) | Polymer Viscosity (cps.)[3] | Polymerizate Character[4] | Flocculation Rate[5] Dose 1 ml. (sec.) | Flocculation Rate[5] Dose 2 ml. (sec.) | Flocculation Rate[5] Dose 3 ml. (sec.) |
|---|---|---|---|---|---|---|---|---|---|---|---|
| 1 | 100% AA | NaCl | 20 | .00962 | 23 | 74 | 22 | Suspension | 40 | 20 | 11 |
| 2 | 100% AA | Na₂SO₄ | 20 | .0962 | 3 | 93 | 18.5 | do | Slow | Slow | 50 |
| 3 | 90% AA/10% AM | Na₂SO₄ | 20 | .092 | 2 | 92.8 | 20 | do | Slow | 58 | 46 |
| 4 | 90% AA/10% AM | NaCl | 20 | .092 | 2 | 92.8 | 14.3 | do | 80 | 63 | 50 |
| 5 | 50% AA/50% AM | Na₂SO₄ | 10 | .0092 | 16 | 75 | 81.5 | do | 5 | 1.9 | 0.8 |
| 6 | 40% AA/60% AM | Na₂SO₄ | 10 | .0092 | 22 | 81.3 | 122 | do | 2.1 | 0.3 | 0.3 |
| 7 | 40% AA/60% AM | NaCl | 10 | .0092 | 20 | 93.2 | 54 | do | 4.7 | 1.6 | 0.9 |
| 8 | 40% AA/60% AM | NaCl | 0.25 | .0092 | 20 | 79.8 | 61.5 | do | 6.9 | | 1.1 |
| 9 | 40% AA/60% AM | Na₂SO₄ | 0.25 | .0036 | 20 | 75.5 | 37.4 | do | 15.0 | | 5.3 |
| 10 | 30% AA/70% AM | Na₂SO₄ | 10 | .0092 | 16 | 90.8 | 17.4 | Thick Suspension | 2.9 | 1.2 | 0.3 |
| 11 | 20% AA/80% AM | Na₂SO₄ | 25 | .00932 | 20 | 95.3 | 45.7 | do | 3.5 | 1.0 | 0.4 |
| 12 | 10% AA/90% AM | Na₂SO₄ | 20 | .092 | 2 | 92.7 | 7.2 | Suspension | | | 66 |

[1] AA=acrylic acid; AM=acrylamide.
[2] The amount of catalyst is in terms of percent by weight of the monomer charge.
[3] The reported viscosity value is that of a 0.4 percent solution of the polymer in 0.5 N NaCl as measured with an Ostwald viscosimeter at 30° C.
[4] Polymerizates characterized as a "suspension" were highly fluid or pourable liquids. All such suspensions were opaque to light and had a milky appearance. "Thick suspensions" had generally substantially higher viscosities but were still manifestly fluid suspensions of solids and were opaque to light.
[5] The "flocculation rate" is the rate of settling obtained by treating aliquots of a 10% slurry of a montmorollonite clay in 0.6 normal sodium hydroxide solution with one, two and three milliliter aliquots of a 0.025 percent by weight solution of the polymer in water. After mixing the polymer dose with the clay slurry in a 100 milliliter stoppered graduate the slurry is revolved three times and the time for the solids of the slurry to settle from the 90 milliliter to the 60 milliliter mark is observed. This time is taken as the measure of the settling rate. The shorter the time, the better the rate.

In other polymerizations salts such as calcium chloride, magnesium sulfate, magnesium chloride, ammonium nitrate, ammonium chloride and ammonium sulfate have been used in place of the inorganic electrolytes employed above to produce suspension polymerizates of acrylic acid polymers.

In general, the alkali metal salts of strong protonic acids are preferred inasmuch as aqueous solutions of such salts are easily adjusted to give desired pH control. Increasing the acidity of the polymerization system sometimes enhances the effectiveness of a salt for forming a suspension polymerizate.

Usually alkali metal salts of hydrochloric acid and hydrobromic acid are more effective for forming suspension polymerizates of polymers having high acrylic acid content and alkali metal salts of sulfuric acid are more effective for forming suspension polymerizates of polymers having high acrylamide contents within the limits prescribed for making suspension polymerizates. These observations are illustrated by comparing the examples shown in the following Table II with the corresponding examples indicated in Table I, which were carried out in an identical manner, except for the amount of salt used.

TABLE II

| Comparative Example No. | Polymerization Conditions (Except for Salt) | Amt. and Type of Salt | Polymerizate Character |
|---|---|---|---|
| 13 | Same as Example 1 | 20% MgSO₄ | Gel. |
| 14 | do | 20% Na₂SO₄ | Gel. |
| 15 | Same as Example 12 | 20% NaCl | Gel. |

Examples 16–18

The following polymerizations illustrate that suspension polymerizates can be prepared when small amounts of a diluent comonomer are incorporated into the acrylic acid or acrylic acid-acrylamide monomer system. The polymerizations were carried out in a manner similar to that of Example 1. The total monomer concentration was 10% and the salt additive was either sodium sulfate or sodium chloride. Details of the polymerization and character of the resulting polymerizate are indicated in the following Table III.

The polymers prepared in the above examples all evidenced good flocculation properties.

In further polymerizations, it was demonstrated that suspension polymerizates are only obtained at an acid pH below about 4. In several systems including 90%/10% copolymers of acrylic acid and acrylamide and 50%/50% copolymers of acrylic acid and acrylamide, increasing the polymerization system to pH 4 and above resulted in non-fluid, gel polymerizates. Homopolymers of acrylic acid can be prepared as suspension polymerizates at pH 4 and slightly above.

In still other polymerizations the effect of increasing salt contents has been observed to have a generally depressing effect on the molecular weight of the polymer obtained as a suspension polymerizate. This is especially true with polymers with high contents of either acrylamide or acrylic acid. Thus for optimum molecular weights, the salt content should be held to just above the minimum necessary to produce a suspension polymerization in a given monomer and catalyst system.

Example 19

To illustrate one unique utility of suspension polymerizates of acrylic acid polymers prepared according to the invention, a given suspension of 40%/60% acrylic acid-acrylamide copolymer was mixed with an acidified polyalkylenepolyamine condensation polymer to prepare a fluid, pourable admixture of an anionic and cationic polymer. The concentrate admixtures must be maintained at a pH below about 4 in order to prevent gelation of the polymer suspension.

Such an admixture was demonstrated to have superior utility as a flocculant for raw sewage. In particular, an aqueous suspension containing 9.3 weight percent suspended polymer solids was mixed with an aqueous solution of a polyalkylenepolyamine condensation polymer obtained as the reaction product of a polyalkylenamine and ethylenedichloride. The cationic condensation polymer solution contained 37 percent by weight polymer solids. This cationic polymer solution was then adjusted to a pH of 4 by the addition of the required amount of sulfuric acid. The aqueous suspension of anionic polymer and acidic solution of the cationic polymer were then

TABLE III

| Example Number | Monomer Composition[1] | Salt Type | Salt Conc. (percent) | Catalyst Conc. (percent) | Polymer Viscosity (cps.) | Polymerizate Character |
|---|---|---|---|---|---|---|
| 16 | 39.6% AA, 1% DMAEM, 59.4% AAM | Na₂SO₄ | 10 | .0092 | 29 | Thin Suspension. |
| 17 | 36% AA, 10% DMAEM, 54% AM | NaSO | 10 | .0092 | 55.8 | Thick Suspension. |
| 18 | 75% AA, 25% VCN | Na₂SO₄ | 10 | .0582 | 13.6 | Thin Suspension. |

[1] AA=acrylic acid; DMAEM=dimethylaminoethylmethacrylate; and VCN=acrylonitrile.

mixed to provide systems of varying anionic/cationic polymer ratios.

The modified suspensions which remained readily pourable were diluted to 0.5 percent by weight total active polymer solids with distilled water. The resulting applicating solutions were adjusted to a pH of about 11 with sodium hydroxide. No polymer precipitation occurred in the dilute systems.

When applied to raw sewage as flocculants, the modified polymer systems produced large rapidly settling flocs. The settling rates produced with all modified polymer suspensions were superior to flocculation obtained with a comparable dosage of the acrylic acid/acrylamide polymer used alone.

In a manner similar to that of the foregoing, enhanced flocculation can be obtained by preparing other mixtures of anionic acrylic acid polymers prepared in the form of suspension polymerizates, according to the invention, with acid salts of other cationic polymers containing a plurality of cationic groups containing nitrogen in a reduced state such as ammonium, amino and amido groups, in and along the polymer chain. In addition, cationic polymers with sulfonium groups may be employed in the place of the nitrogen based cationic polymers. Examples of water-soluble cationic polymers which can be utilized in admixture with the suspension polymerizates of the invention include poly-aminoalkyl acrylates, such as poly-aminoethyl acrylate, poly-dimethyl aminoethyl acrylate, poly-N-dimethylaminomethyl acrylamide, poly-N-dimethylaminoethyl acrylamide, polyvinylbenzyltrimethyl ammonium chloride, polyvinylbenzyldihydroxyethyl sulfonium chloride, polyethylenimine, condensation polymers of epichlorohydrin and polyamines, and in general any water-soluble essentially cationic polymer having in and along the polymer chain a plurality of cationic moieties.

To render the cationic polymers compatible with the acidic suspension polymerizates of acrylic polymers described herein, it is only necessary that polymers be obtained in their neutral or acidic salt forms, or be reacted with an appropriate acid, prior to mixing them with the suspension polymerizate. Most effective are mixtures containing from 0.03 to 0.2 part of the cationic polymer per part by weight of the acrylic acid polymer. The resulting fluid admixtures of the anionic suspension polymerizate and cationic polymers are highly useful modified flocculants for a variety of aqueous suspensions of dispersed solids amenable to flocculation by either anionic or cationic polymers.

As illustrated in the above example, the modified suspension admixtures are readily prepared for use by dilution with sufficient water, in which they may be neutralized, to prepare an effectively dilute admixture of the two polymer systems for flocculation purposes. Alternately the modified suspensions can be used without neutralization to achieve good results.

What is claimed is:

1. A composition of matter comprising (a) water, (b) from 1 to about 30 percent by weight based on the total composition of an acrylic acid polymer obtained by polymerizing with agitation a monomer composition comprising at least about 10 weight percent acrylic acid, from 0 up to about 90 weight percent of an acrylamide monomer, and from 0 up to 25 weight percent of a diluent monomer, (c) a water-soluble ammonium, alkali metal, alkaline earth metal or zinc salt of a strong inorganic acid in an amount sufficient to maintain the polymer as a suspension of polymer solids in the composition, said composition being at a pH within the range of about 1 to about 4 and including in admixture (d) from about 0.03 to about 0.2 part by weight of a water-soluble cationic polymer per part by weight of suspended acrylic acid polymer solids, said cationic polymer containing a plurality of cationic groups containing nitrogen in a reduced state or cationic groups comprising sulfonium groups.

2. A composition as in claim 1 wherein the diluent monomer is a water-soluble aminoalkyl acrylate.

3. A composition as in claim 1 wherein the monomer composition from which the acrylic acid polymer is prepared comprises from about 70 to about 30 weight percent of acrylic acid and from about 30 to about 70 weight percent acrylamide.

4. A composition as in claim 1 wherein the water-soluble cationic polymer is a polyalkylenepolyamine condensation polymer.

5. A method for the flocculation of an aqueous suspension of solids which comprises mixing with such suspension a small but effective amount of the composition of claim 1.

6. A method for the flocculation of an aqueous suspension of solids which comprises mixing with such suspension a small but effective amount of the composition of claim 2.

References Cited

UNITED STATES PATENTS 3,114,651 12/1963 Gentile.
3,215,680 11/1965 Kolodny.

FOREIGN PATENTS 6,505,750 12/1965 Netherlands.

OTHER REFERENCES

Weissberger, Technique of Organic Chemistry, vol. III, Part I, pp. 474–5, New York, Interscience Publishers Inc., 1956.

MURRAY TILLMAN, Primary Examiner

H. ROBERTS, Assistant Examiner

U.S. Cl. X.R.

209—5; 260—2, 29.6, 78.5, 79.3, 80, 80.3, 80.72, 80.73, 85.5, 86.1, 87.4, 89.6, 89.8